United States Patent
Kano (10) Patent No.: US 8,542,920 B2
(45) Date of Patent: Sep. 24, 2013

(54) IMAGE PROCESSING APPARATUS, IMAGE PROCESSING METHOD, AND PROGRAM

(75) Inventor: Akira Kano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 13/180,346

(22) Filed: Jul. 11, 2011

(65) Prior Publication Data

US 2012/0014599 A1 Jan. 19, 2012

(30) Foreign Application Priority Data

Jul. 14, 2010 (JP) .................................. 2010-159569

(51) Int. Cl.
*G06K 9/00* (2006.01)

(52) U.S. Cl.
USPC .......................................................... 382/167

(58) Field of Classification Search
USPC ................ 382/162, 167, 174, 286; 358/3.26, 358/461, 518, 537
See application file for complete search history.

(56) References Cited

U.S. PATENT DOCUMENTS 7,751,619 B2 * 7/2010 Kawanishi et al. ........... 382/167

FOREIGN PATENT DOCUMENTS

| JP | 2000-299874 A | 10/2000 |
| JP | 2006-20275 A | 1/2006 |

* cited by examiner

*Primary Examiner* — Duy M Dang (74) *Attorney, Agent, or Firm* — Canon USA Inc. IP Division (57) ABSTRACT

In an image processing apparatus, an edge extraction unit extracts edges from image data. A correction amount acquisition unit acquires a misregistration amount of one color plane relative to another color plane of the image data, and calculates a first correction amount corresponding to an image height based on image heights of respective edges and misregistration amounts of respective edges. The correction amount acquisition unit calculates a second correction amount specific to a lens based on lens design data. A correction amount calculation unit calculates a difference between the first correction amount and the second correction amount, adjusts the difference so that the difference falls within a predetermined range, and calculates a third correction amount based on the adjusted difference and the second correction amount. A correction unit corrects the image data based on the third correction amount.

9 Claims, 7 Drawing Sheets

IMAGE PROCESSING APPARATUS, IMAGE PROCESSING METHOD, AND PROGRAM

BACKGROUND OF THE INVENTION

1. Field of the Invention

The present invention relates to a technique for appropriately correcting a color misregistration.

2. Description of the Related Art

Conventionally, an imaging apparatus such as a digital camera is used for a variety of applications. However, various aberrations which an imaging lens used for forming an object image has, become a cause for deteriorating an image quality of the object image. For example, lateral chromatic aberration becomes a cause for a color misregistration on the formed object image. Since the number of pixels of an image sensor used in the imaging apparatus is increasing year after year, a unit pixel size is showing a tendency to decrease, and even such a degree of lateral chromatic aberration that has conventionally given little problems has become a main cause for deteriorating the image quality.

As a technique for correcting such a color misregistration by image processing, a technique for acquiring a color misregistration amount to be corrected (that is, a correction amount) from image data of a correction target is discussed. As the technique for acquiring a color misregistration amount from image data, there is a method in which a correlation between respective color components at edge portions of the image data is utilized.

For example, Japanese Patent Application Laid-Open No. 2000-299874 discusses a method for acquiring a color misregistration amount by searching for a position at which a total of differences of distances of pixels of respective color components corresponding to edges becomes minimal. In addition, Japanese Patent Application Laid-Open No. 2006-20275 discusses a method for detecting edges from raw data and determining a displacement width, in which an error of array of two types of color components at edge portions becomes minimal, as a color misregistration width.

However, the method for acquiring the amount of color misregistration from image data as described above may not allow an appropriate amount of color misregistration to be acquired in some cases, with respect to image data containing a lot of noises, an object tinted with a color like lateral chromatic aberration at edges, or image data which has too low a contrast to detect the edges.

Although there is also a method for determining a correction amount based on lens design data, it is conceivable that an accurate correction amount of lateral chromatic aberration cannot be obtained depending on a manufacturing error of a lens or shooting conditions such as color temperature of a light source or an object.

SUMMARY OF THE INVENTION

The present invention is directed to an image processing apparatus capable of acquiring a correction amount which allows a color misregistration to be appropriately corrected.

According to an aspect of the present invention, an image processing apparatus includes a detection unit configured to detect edges from image data output from an imaging unit, an acquisition unit configured to acquire a misregistration amount of one color plane relative to another color plane of the image data in each edge detected by the detection unit, a first calculation unit configured to, based on a distance of each edge from a center of the image data and the misregistration amount of each edge acquired by the acquisition unit, calculate a first correction amount corresponding to the distance from the center of the image data, a second calculation unit configured to, based on design data of a lens in the imaging unit, calculate a second correction amount specific to the lens, an adjustment unit configured to calculate a difference between the first correction amount and the second correction amount and to adjust the difference so that the difference falls within a predetermined range, a third calculation unit configured to calculate a third correction amount based on the difference adjusted by the adjustment unit and the second correction amount, and a correction unit configured to correct the image data based on the third correction amount.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In an exemplary embodiment of the present invention, a method for acquiring a color misregistration amount between two color components (color planes), for example, G-plane and R-plane, will be described. However, a color misregistration amount between other color planes, for example, G-plane and B-plane, can be acquired in a similar manner.

Figure 1:
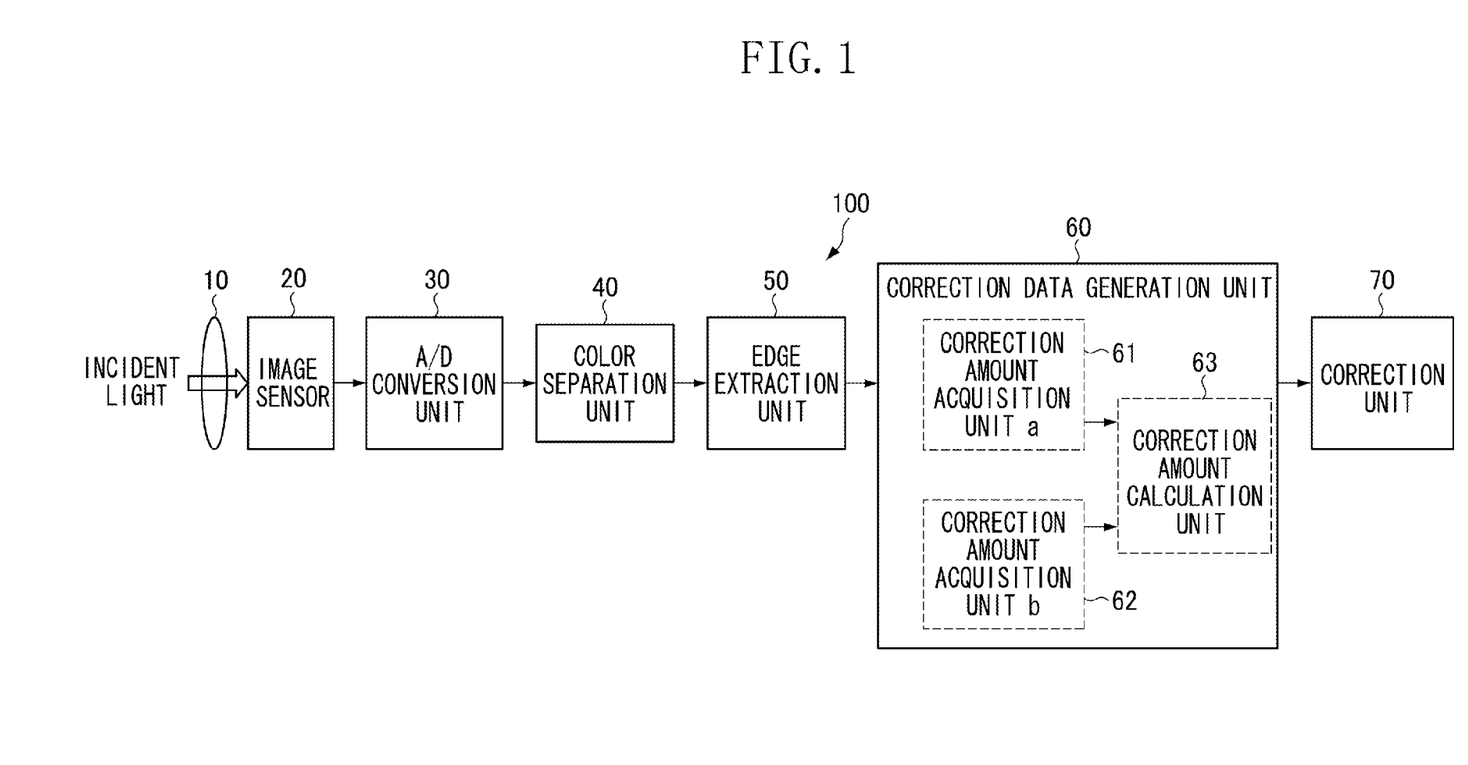
FIG. 1 is a block diagram illustrating a configuration of an imaging apparatus according to an exemplary embodiment of the present invention.

FIG. 1 is a block diagram illustrating a configuration of an imaging apparatus 100 according to a first exemplary embodiment of the present invention. As illustrated in FIG. 1, the imaging apparatus 100 according to the present exemplary embodiment includes an image forming optical system 10, an image sensor 20, an analog-to-digital (A/D) conversion unit 30, a color separation unit 40, an edge extraction unit 50, a correction data generation unit 60, and a correction unit 70. The correction data generation unit 60 includes a correction amount acquisition unit (a) 61, a correction amount acquisition unit (b) 62, and a correction amount calculation unit 63.

The imaging apparatus 100 has a configuration which becomes an application example of the image processing apparatus according to the present invention.

The image forming optical system 10 forms an object image on the image sensor 20. In the present exemplary embodiment, the image sensor 20 is a single-plate color image sensor in which photoelectric conversion elements are two-dimensionally arrayed, and is provided with a general primary-colors filter. The primary-colors filter has a configuration in which three types of unit filters (R-filter, G-filter, and B-filter) having transparent main wavelength bands in the proximity of 650 nm, 550 nm, and 450 nm are two-dimensionally arrayed so that one type corresponds to one of the photoelectric conversion elements. Accordingly, each of the photoelectric conversion elements receives light which has passed through any one type of the unit filters, and outputs an electric signal representing its intensity. Therefore, each of the photoelectric conversion elements of the single-plate color image sensor can only output one intensity out of R-, G-, and B-planes. For this reason, the image data which the image sensor 20 outputs is color mosaic image data.

The A/D conversion unit 30 converts color mosaic image data of analog signals from the image sensor 20 into color mosaic image data of digital signals suitable for subsequent image processing. The color separation unit 40 generates color image data complete with color information of R, G, and B in all pixels by interpolating the color mosaic image data. In the interpolation methods, many schemes such as bi-linear interpolation and bicubic interpolation are discussed, but any interpolation method may be used in the present exemplary embodiment.

The edge extraction unit 50 detects edges from the generated color image data. The correction data generation unit 60 acquires a correction amount by analyzing the color image data, acquires a correction amount from lens design data, and then determines a correction amount to be finally used using these correction amounts. The correction unit 70 corrects lateral chromatic aberration of the color image data using the correction amount generated by the correction data generation unit 60.

Figure 2:
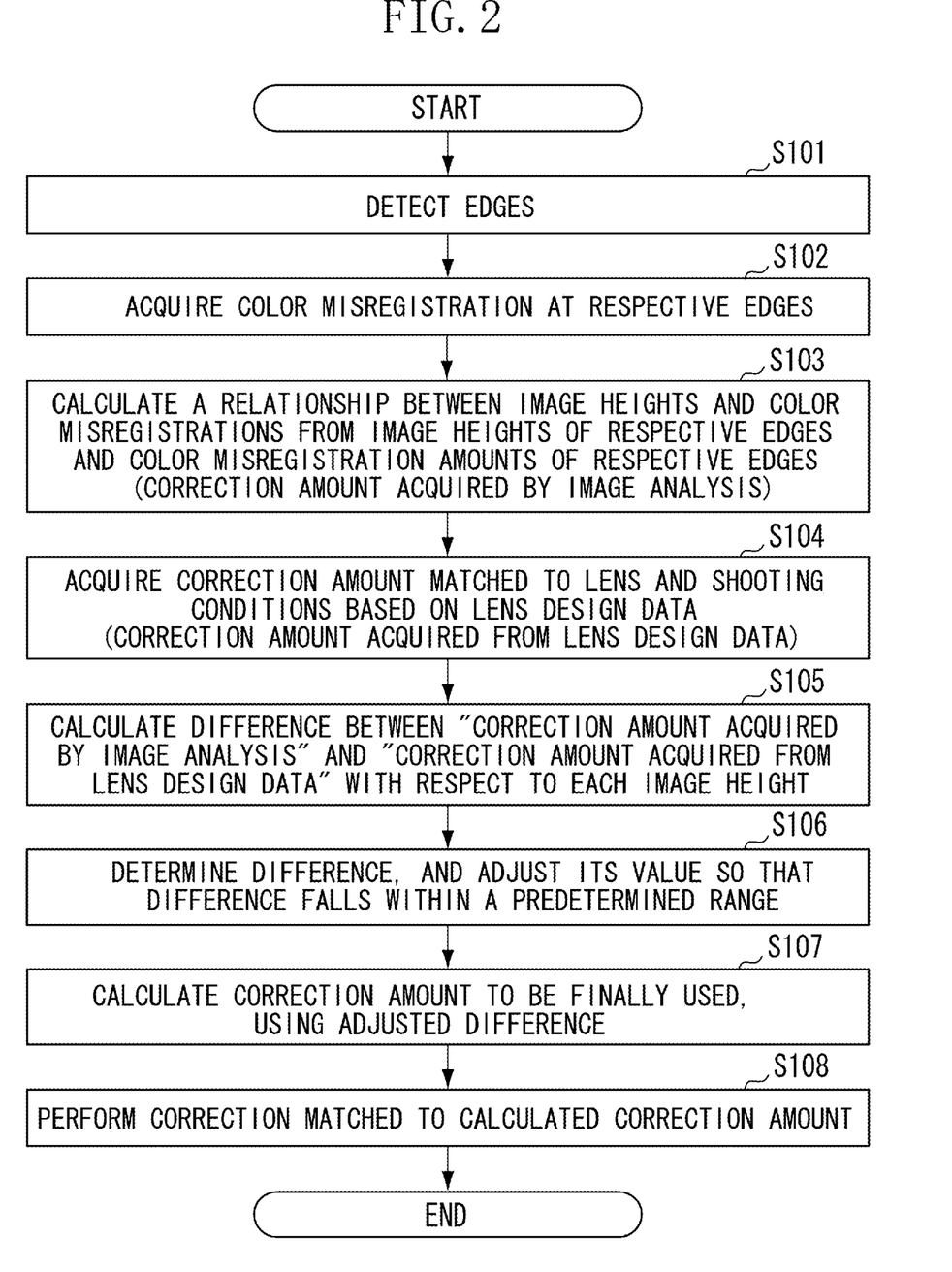
FIG. 2 is a flowchart illustrating a flow of processing by an edge extraction unit, a correction data generation unit, and a correction unit involved in correction of lateral chromatic aberration.

FIG. 2 is a flowchart illustrating a flow of processing by the edge extraction unit 50, the correction data generation unit 60, and the correction unit 70, for correction of lateral chromatic aberration.

First in step S101, the edge extraction unit 50 detects edges from the color image data generated by the color separation unit 40. This is because the color misregistration due to lateral chromatic aberrations of the image forming optical system 10 occurs conspicuously on the edges of the image data. Y-(luminance) plane is used for edge detection of the image data. The Y-plane can be calculated using a publicly known formula from RGB planes. Values of the G-plane may be used as the Y-plane.

By restricting the edges detected in step S101 to edges of which pixel value significantly varies according to a radial direction from an optical center, it becomes possible to acquire a color misregistration amount with a high accuracy. In the Y-plane, since the color misregistration due to lateral chromatic aberration occurs as a bleeding, edges having a certain degree of width having, for example, a predetermined number of consecutive monotonous increases or monotonous decreases of pixel values are detected.

In step S102, the correction amount acquisition unit (a) 61 acquires color misregistration amounts in respective edges detected in step S101. The acquisition of the color misregistration amount is performed by searching for a position at which a correlation of R-plane (or B-plane) relative to G-plane becomes greatest. It is only necessary to determine an absolute value of a difference between a signal level of the R-plane and a signal level of the G-plane at an edge, while moving a position of, for example, the R-plane relative to the G-plane, and to take a movement amount of the R-plane when the absolute value becomes a minimum value as the color misregistration amount. The processing can be simplified by taking the direction of the color misregistration acquired in step S102, as any of top/bottom direction, left/right direction, oblique top right/oblique bottom left direction, oblique top left/oblique bottom right direction, depending on a positional relationship between the optical center and respective edges.

The color misregistration amount acquired in step S102 takes a negative value when the R-plane (or B-plane) relative to the G-plane is misregistered in the optical center direction, and takes a positive value when the R-plane (or B-plane) relative to the G-plane is misregistered in an opposite direction to the optical center.

In step S103, the correction amount acquisition unit (a) 61 generates the correction amounts by obtaining a relationship between the image heights and the color misregistrations from image heights of respective edges detected in step S101, and color misregistration amounts of respective edges acquired in step S102. The image height is a distance from a pixel equivalent to the optical center (hereinafter, referred to as an image center or an optical center).

Here, a procedure of generating correction data which the correction amount acquisition unit (a) 61 performs in step S103 will be specifically described.

(1) The correction amount acquisition unit (a) 61, when an image height of the edge detected in step S101 is denoted as P, and the color misregistration amount acquired in step S102 is denoted as D, determines a color misregistration ratio M to an image height as M=P/D.

Figure 3:
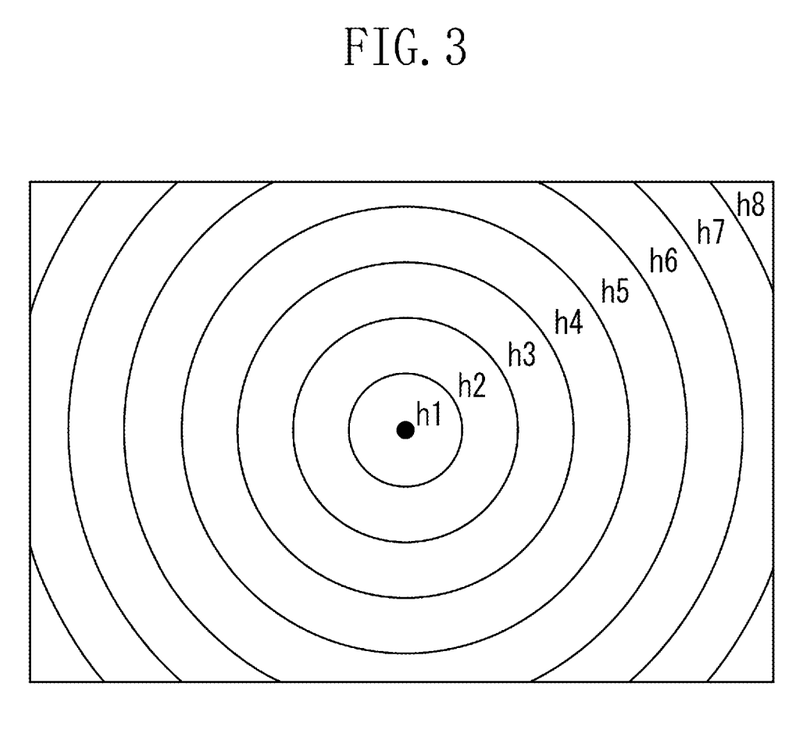
FIG. 3 illustrates a state in which image data is divided into eight regions with respect to each image height.

(2) The correction amount acquisition unit (a) 61 divides the image data into eight regions (h1 to h8) with respect to each image height, as illustrated in FIG. 3, and selects a region to which an individual edge belongs.

(3) The correction amount acquisition unit (a) 61 performs the processing in (1) and (2) on individual edges detected within the image data, and determines an average value of the color misregistration ratios M with respect to each region, and takes it as a color misregistration ratio with respect to each region.

(4) The correction amount acquisition unit (a) 61 calculates, from image heights and color misregistration ratios with respect to each region, a higher-order polynomial approximate equation representing a relationship between the image heights and the color misregistration ratios which is referred to as a "correction amount acquired by image analysis". By determining a product of an image height and a color misregistration ratio, a color misregistration amount at the image height is calculated, which can be taken as a correction amount at the image height. Further, a "correction amount acquired by image analysis" is a configuration which becomes an application example of a first correction amount according to the present exemplary embodiment, and the above-described processing for calculating the "correction amount acquired by image analysis" is a processing example of a first calculation unit according to the present exemplary embodiment.

The detection of edges and the acquisition of color misregistration amounts may be performed on all edges contained in the color image data. At a stage in which a predetermined number of edges and misregistration amounts are acquired, at each of eight regions divided with respect to each image height, and the predetermined number of color misregistration ratios are added up, the detection of edges belonging to the region and the acquisition of color misregistration amounts may be terminated. Accordingly, it is possible to achieve streamlining of the processing while keeping reliability of the color misregistration ratios.

The correction amount acquisition unit (a) 61 uses a region where the edges to be detected have been found for calculation of the higher-order polynomial approximate equation, out of eight regions divided with respect to each image height. Accordingly, even when a region where the edges to be detected have not been found, it becomes possible to generate a correction amount for the region.

Furthermore, the correction amount acquisition unit (a) 61 can increase the reliability of the correction amounts, by determining a dispersion of the acquired color misregistration ratios and using only a reliable region for the calculation of the higher-order polynomial approximate equation, out of eight regions divided with respect to each image height.

In step S104, the correction amount acquisition unit (b) 62 acquires an amount of lateral chromatic aberration specific to a lens, based on shooting conditions such as an object distance, a focal length, and an aperture value during shooting, and lens design data. This is referred to as a "correction amount acquired from lens design data". The "correction amount acquired from lens design data" is a configuration which becomes an application example of a second correction amount according to the present exemplary embodiment, and the above-described processing for calculating the "correction amount acquired from lens design data" is a processing example of a second calculation unit according to the present exemplary embodiment. A memory (not illustrated) of the imaging apparatus 100 has stored in advance amounts of lateral chromatic aberration, and the correction amount acquisition unit (b) 62 reads out the amounts of lateral chromatic aberration from the memory. If a lens unit including the image forming optical system 10 is detachably mounted on the imaging apparatus 100, a configuration for keeping the amounts of lateral chromatic aberration stored in advance in the memory within the lens unit may be used. Alternatively, the correction amount acquisition unit (b) 62 may acquire the amounts of lateral chromatic aberration from an external device via a storage medium or via wireless or wired communication.

Figure 4A:
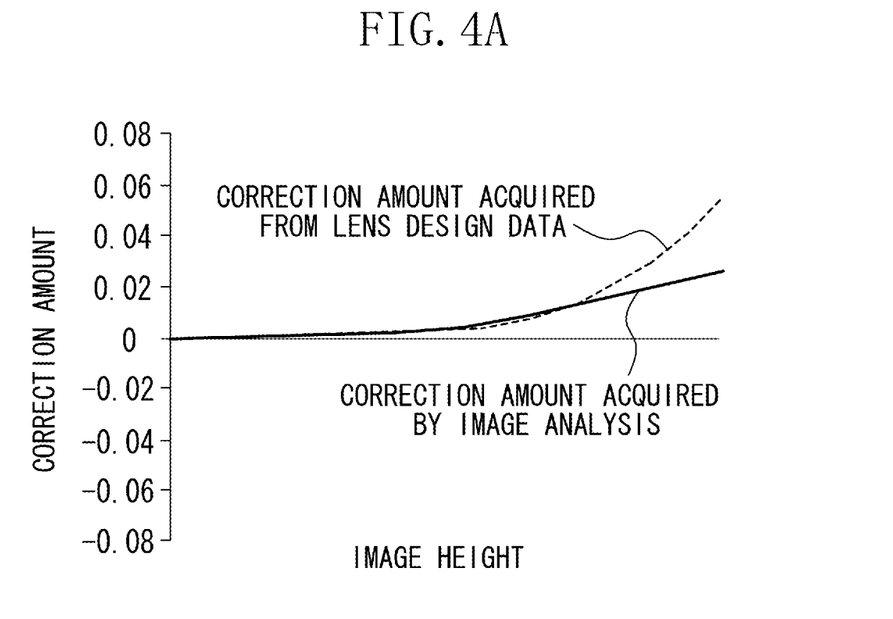
FIG. 4A illustrates correction amounts acquired by image analysis and correction amounts acquired from lens correction data.

FIG. 4A illustrates an example of "correction amount acquired by image analysis" and "correction amount acquired from lens design data". The "correction amount acquired by image analysis" acquired in step S103 may not be appropriate value with respect to image data containing much noise, an object having an edge tinted with a color like lateral chromatic aberration, or image data which has too low a contrast to detect edges. Therefore, even if a correction amount is used for correction as it is, a color misregistration may not be improved, or a fatal erroneous correction that will lead to a loss of a color inherent to the object may occur.

The "correction amount acquired from lens design data" acquired in step S104 may not become an accurate correction amount of lateral chromatic aberration, depending on manufacturing error of a lens or shooting conditions such as color temperature of a light source or an object. However, generally an influence of manufacturing error of a lens or shooting conditions such as color temperature of a light source or an object is not enough to significantly change characteristics of the "correction amount acquired from lens design data". Therefore, an ideal correction amount to be used for correction can be considered to vary within a certain range, centering on the "correction amount acquired from lens design data". In the present exemplary embodiment, an appropriate correction amount corresponding to shot image data is calculated by determining and adjusting a difference between the "correction amount acquired by image analysis" and the "correction amount acquired from lens design data".

In step S105, the correction amount calculation unit 63 calculates a difference D (p) between the "correction amount acquired by image analysis" and the "correction amount acquired from lens design data" with respect to each image height. Here, p denotes an image height, A_image (p) denotes a "correction amount acquired by image analysis", A_design (p) denotes a "correction amount acquired from lens design data", D(p) denotes a value obtained by subtracting A_design (p) from A_image(p), and T(p) denotes a threshold value for difference determination.

In step S106, the correction amount calculation unit 63 compares an absolute value of the difference D(p) calculated in step S105 with the threshold value T(p) for difference determination. If the difference D(p) is greater than the threshold value T(p) for difference determination, the correction amount calculation unit 63 replaces a value of the difference D(p) with a value of the threshold value T(p) for difference determination. Further, if the difference D(p) is smaller than −T(p), which is a negative value of the threshold value T(p) for difference determination, the correction amount calculation unit 63 replaces a value of the difference D (p) with a value of −T(p), which is a negative value of the threshold value T(p) for difference determination.

The threshold value T(p) for difference determination is a threshold value set according to an image height, and is set, for example, using formula (1).

$$T(p) = K \times p \quad (1)$$

Figure 4B:
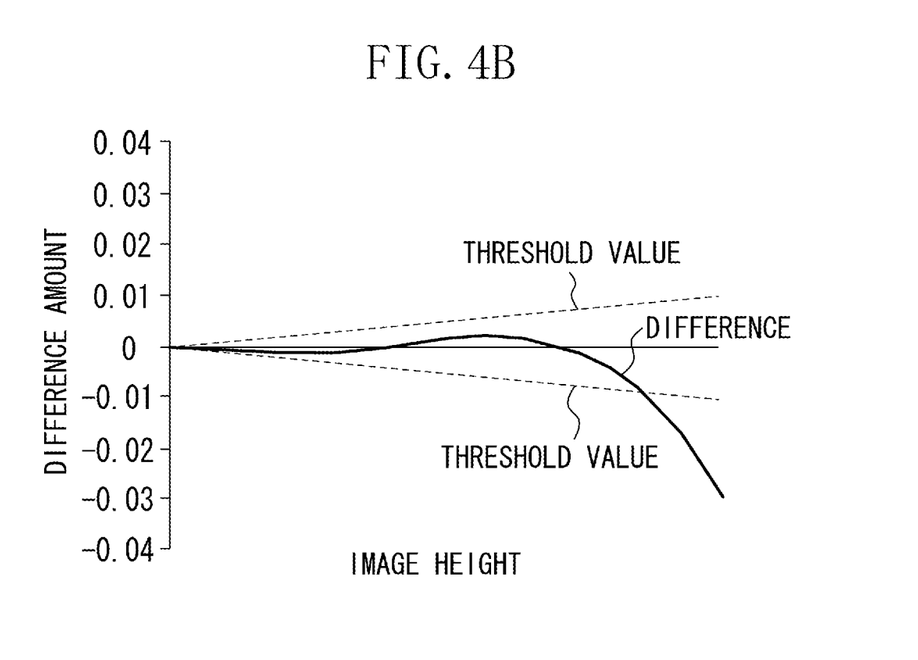
FIG. 4B illustrates differences before adjustment and threshold values for difference determination.
Figure 4C:
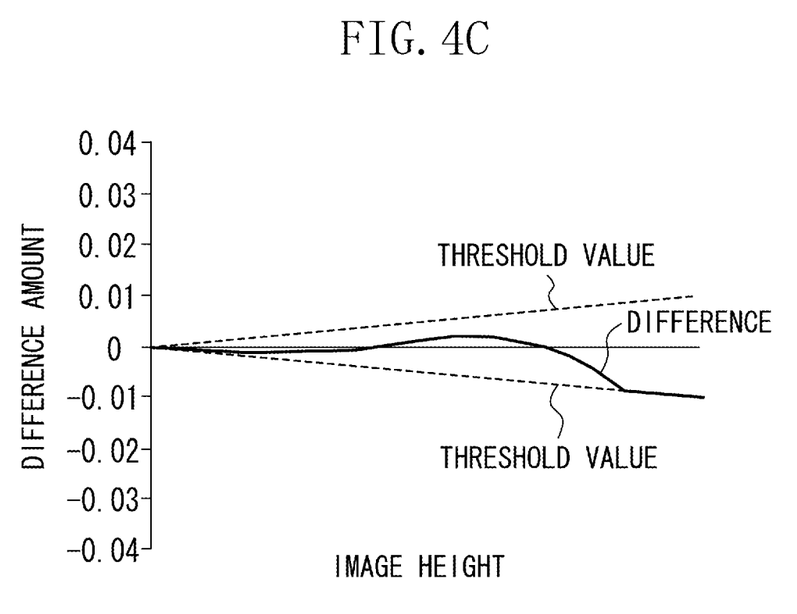
FIG. 4C illustrates differences after adjustment and threshold values for difference determination.

FIG. 4B illustrates a difference D(p) before adjustment and a threshold value T(p) for difference determination. FIG. 4C illustrates a difference D(p) after adjustment and a threshold value T(p) for difference determination. A value of K indicates a permissible range of a difference between the "correction amount acquired from lens design data" and a correction amount which is actually used for correction. The value of K can be determined by simulating an influence in advance by dispersions of amounts of lateral chromatic aberration due to manufacturing errors of a lens used for shooting, and shooting conditions such as color temperature of a light source or an object. In other words, in step S106, the correction amount calculation unit 63 determines that a portion where a difference between the "correction amount acquired by image analysis" and the "correction amount acquired from lens design data" is greater than an assumed value, has a high possibility that the "correction amount acquired by image analysis" is not correct. Therefore, the correction amount calculation unit 63 is configured to use a difference within an assumed range. More specifically, the correction amount calculation unit 63 adjusts a value of the difference D(p) so that the difference D(p) before adjustment falls within a predetermined range which is set by the threshold value T(p) for difference determination. Here, with regard to a portion which exceeds the above-described predetermined range in the difference D(p) before adjustment, the correction amount calculation unit 63 adjusts the difference D(p) so that the portion becomes an upper limit value or a lower limit value of the above-described predetermined range.

In step S107, the correction amount calculation unit 63 sets a "correction amount to be finally used" A(p) using the adjusted difference D(p) in formula (2).

$$A(p) = A\_design(p) + D(p) \quad (2)$$

Figure 4D:
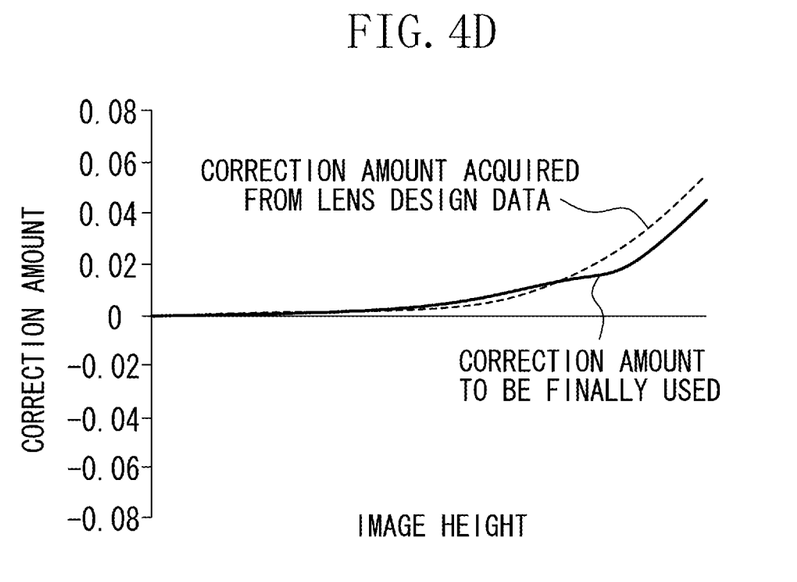
FIG. 4D illustrates correction amounts to be used finally.

Therefore, the "correction amount to be finally used" becomes as illustrated in FIG. 4D. The "correction amount to be finally used" is a configuration which becomes an application example of a third correction amount according to the present exemplary embodiment, and the above-described processing for calculating the "correction amount to be finally used" is a processing example of a third calculation unit according to the present exemplary embodiment.

In step S108, the correction unit 70 performs correction of lateral chromatic aberration by performing variation of magnification in the image height direction relative to the R-plane (or B-plane) using the correction amount A(p) generated in step S107.

In this way, in the present exemplary embodiment, instead of determining a correction amount only by image analysis, it is possible to determine a correction amount which allows the color misregistration to be appropriately corrected, by considering lens design data.

Next, a second exemplary embodiment of the present invention will be described. Since the present exemplary embodiment is similar to the first exemplary embodiment except for an adjustment method for a difference implemented in step S106, only the adjustment method for the difference in the present exemplary embodiment will be described below.

Figure 4E:
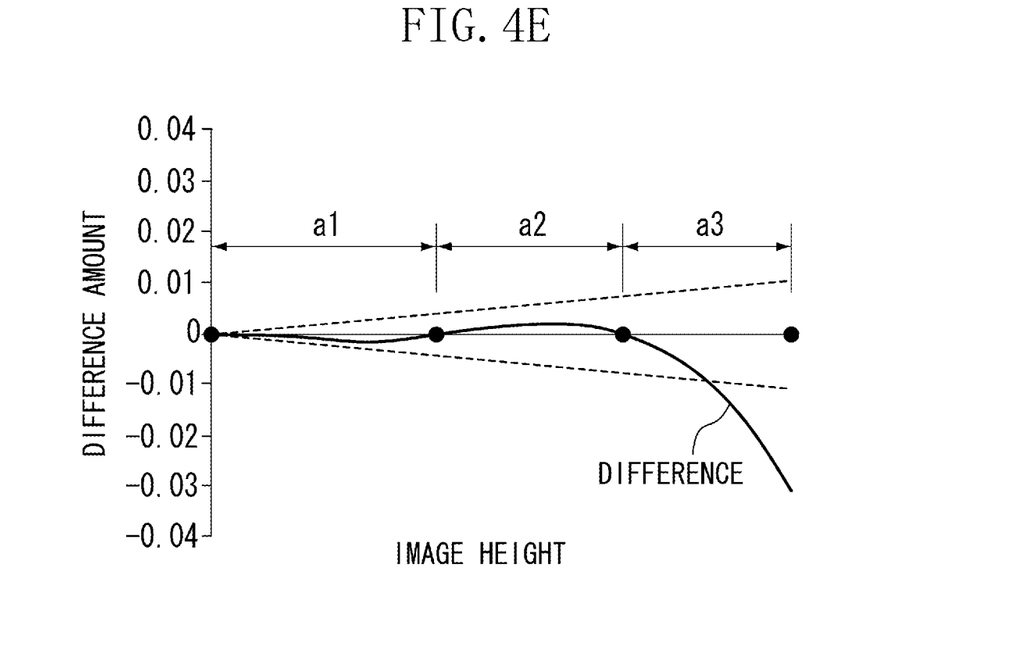
FIG. 4E illustrates differences before adjustment and threshold values for difference determination.

In the second exemplary embodiment, an adjustment of the difference to be implemented in step S106 includes dividing into areas to be adjusted based on image heights, and performing adjustment with respect to each area. First, as illustrated in FIG. 4E, the image height is divided into areas a1 to a3 according to positions at which the difference becomes zero. The areas in which the differences fall within the threshold value like the areas a1 and a2 are not subjected to adjustment of the difference. An area including a difference exceeding the threshold value like the area a3 becomes a target of the adjustment.

The correction amount calculation unit 63 searches for a minimum value Gmin of values G obtained by formula (3) at the respective image heights of the area a3.

$$G=|T(p)|/|D(p)| \quad (3)$$

Next, the correction amount calculation unit 63 performs adjustment of the difference by multiplying the difference of the area a3 by the determined Gmin using formula (4).

$$D(p)=D(p) \times Gmin \quad (4)$$

Figure 4F:
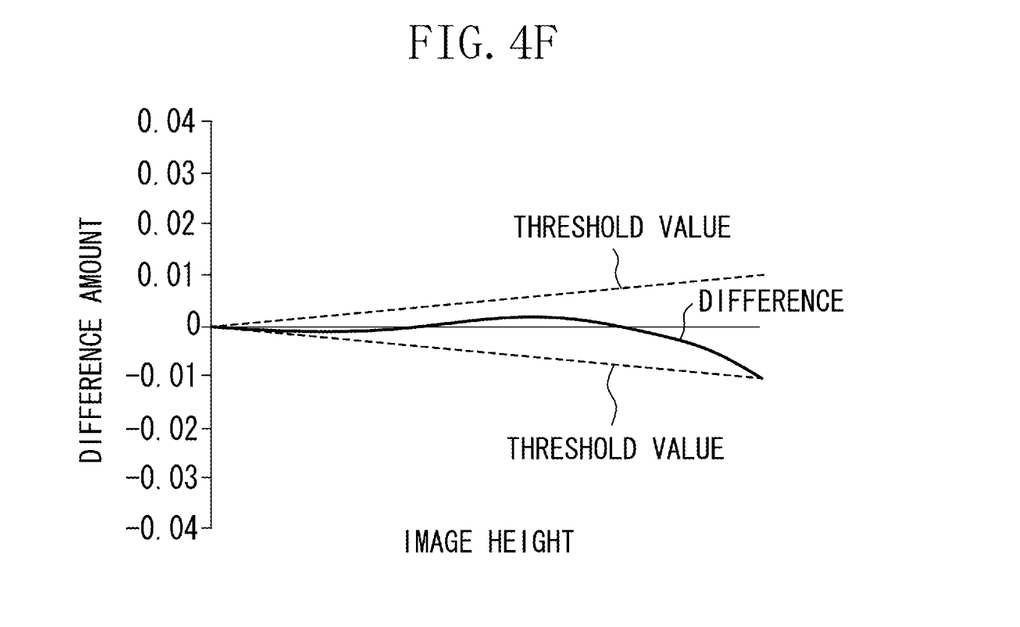
FIG. 4F illustrates differences after adjustment and threshold values for difference determination.

The difference after adjustment by the method is illustrated in FIG. 4F. The "correction amount to be finally used" is similar to the one in the first exemplary embodiment, and can be determined based on formula (5).

$$A(p)=A\_design(p)+D(p) \quad (5)$$

Figure 4G:
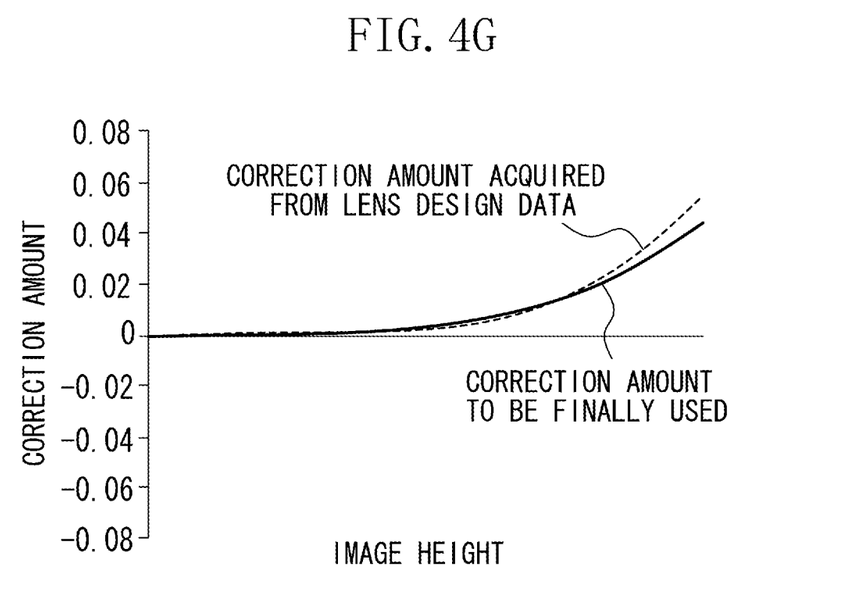
FIG. 4G illustrates correction amounts to be finally used.

Therefore, the "correction amount to be finally used" is given as illustrated in FIG. 4G.

In the present exemplary embodiment, an adjustment area for a difference is divided according to image heights, the difference is multiplied by a gain with respect to each divided area, and its value is adjusted so that the difference falls within a range set by the threshold value T(p) for difference determination. Therefore, in the present exemplary embodiment, a phenomenon in which a correction amount changes rapidly at a certain image height can be reduced, and it becomes possible to calculate a natural correction amount.

Further, the present invention can be also realized by executing the following processing. More specifically, the processing is carried out by supplying software (a program) that realizes the above-described functions of the exemplary embodiments, to a system or an apparatus via a network or various types of non-volatile storage media, and causing a computer (or devices such as a CPU, a micro-processing unit (MPU), and/or the like) of the system or apparatus to read out and execute the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-159569 filed Jul. 14, 2010, which is hereby incorporated by reference herein in its entirety.

What is claimed is:

1. An image processing apparatus comprising:
an acquisition unit configured to acquire a misregistration amount of one color plane relative to another color plane of plurality of areas of image data output from an imaging unit;
a first calculation unit configured to, based on a distance of each area from a center of the image data and the misregistration amount of each area acquired by the acquisition unit, calculate a first correction amount corresponding to the distance from the center of the image data;
a second calculation unit configured to, based on design data of a lens in the imaging unit, calculate a second correction amount specific to the lens;
a third calculation unit configured to calculate a third correction amount based on the first correction amount and the second correction amount; and
a correction unit configured to correct the image data based on the third correction amount,
wherein a difference between the second correction amount and the third correction amount falls within a predetermined range.

2. The image processing apparatus according to claim 1, wherein the predetermined range is a range set according to the distance from the center the image data.

3. The image processing apparatus according to claim 1, wherein the third calculation unit calculates a difference between the first correction amount and the second correction amount, adjusts the difference so that the difference falls within a predetermined range, and calculates the third correction amount based on the difference and the second correction amount.

4. The image processing apparatus according to claim 3, wherein, if the difference exceeds the predetermined range, the third calculation unit sets a portion of the difference exceeding the predetermined range to an upper limit value or a lower limit value of the predetermined range.

5. The image processing apparatus according to claim 3, wherein the third calculation unit applies a gain to the difference so that the difference falls within the predetermined range.

6. The image processing apparatus according to claim 1, wherein the plurality of areas are edges detected from the image data.

7. The image processing apparatus according to claim 6, wherein the acquisition unit acquires misregistration amounts corresponding to the predetermined number of edges, the first calculation unit calculates the first correction amount corresponding to the distance from the center of the image data based on distances of the predetermined number of edges from the center of the image data and the misregistration amounts corresponding to the predetermined number of edges.

8. An image processing method executable by an image processing apparatus, the image processing method comprising:

acquiring a misregistration amount of one color plane relative to another color plane of plurality of areas of image data output from an imaging unit;

calculating, based on a distance of each area from a center of the image data and the acquired misregistration amount of each area, a first correction amount corresponding to the distance from the center of the image data;

calculating, based on design data of a lens in the imaging unit, a second correction amount specific to the lens;

calculating a third correction amount based on the first correction amount and the second correction amount; and correcting the image data based on the third correction amount, wherein a difference between the second correction amount and the third correction amount falls within a predetermined range.

9. A non-transitory computer-readable storage medium storing a program for causing a computer to execute the image processing method according to claim 8.

* * * * *